Oct. 28, 1969
H. V. ETTORE ET AL  3,475,261
PLASTIC COVERED LAMINATE, AND METHOD, AND APPARATUS FOR MANUFACTURING THE SAME
Filed June 2, 1964  3 Sheets-Sheet 1
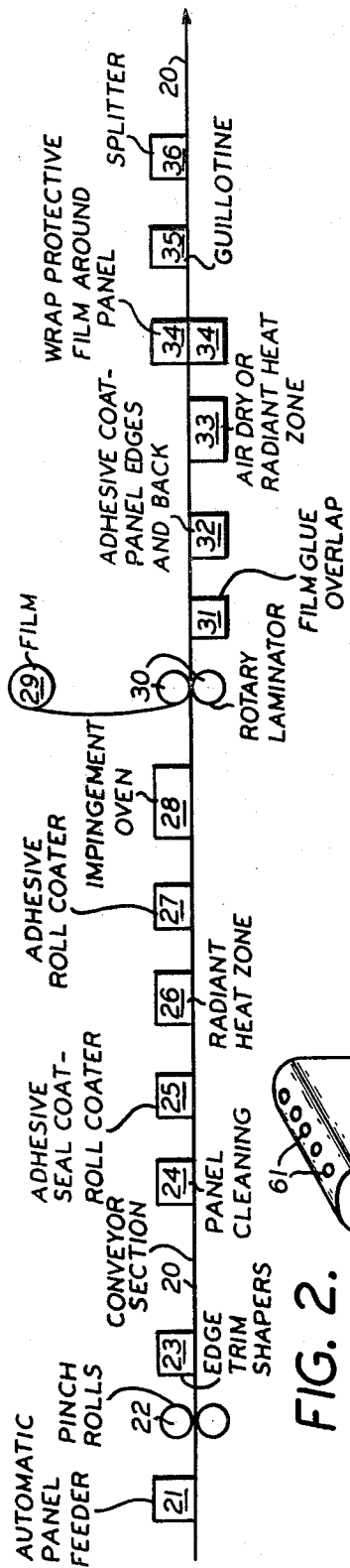
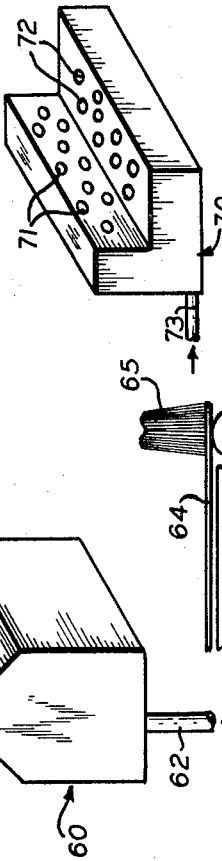
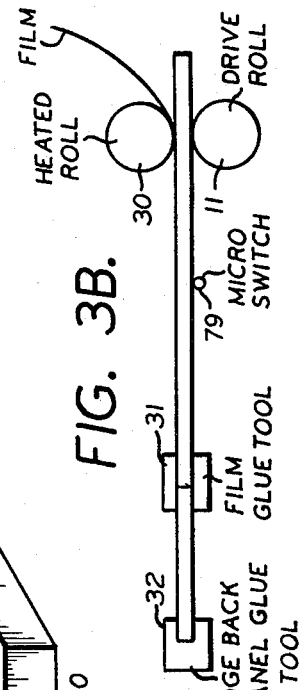
INVENTORS
HAROLD V. ETTORE
FREDERICK R. ASHBY
HARLAN N. FACCOU
BY *James M. Heilman*
ATTORNEY.

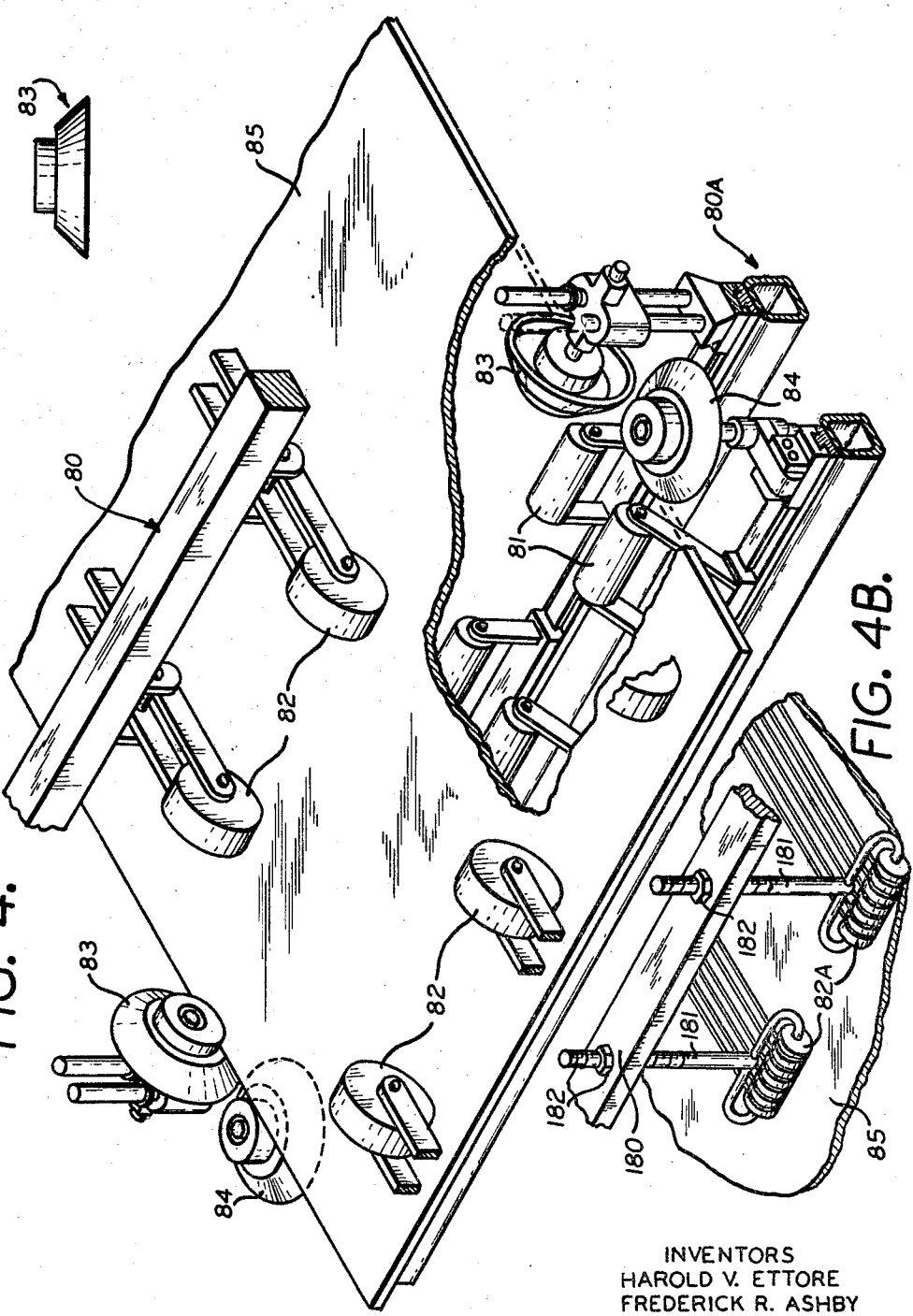

Oct. 28, 1969 H. V. ETTORE ET AL 3,475,261
PLASTIC COVERED LAMINATE, AND METHOD, AND APPARATUS
FOR MANUFACTURING THE SAME
Filed June 2, 1964 3 Sheets-Sheet 3
FIG. 5.
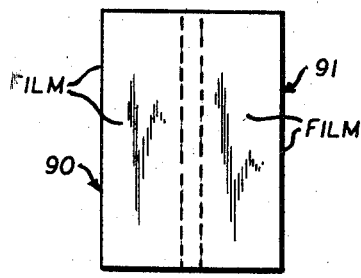
FIG. 6.
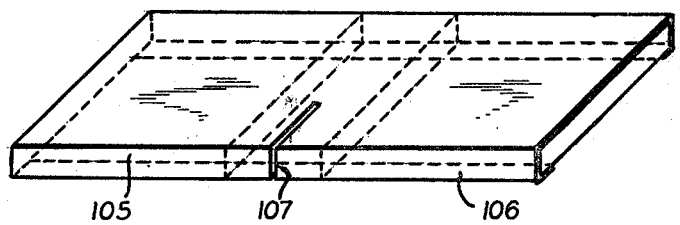
FIG. 5A.
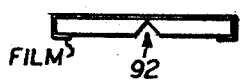
FIG. 5B.
FIG. 6B.
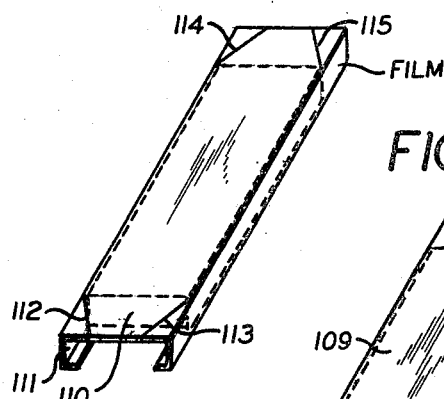
FIG. 6A.
FIG. 5C.
FIG. 5D.
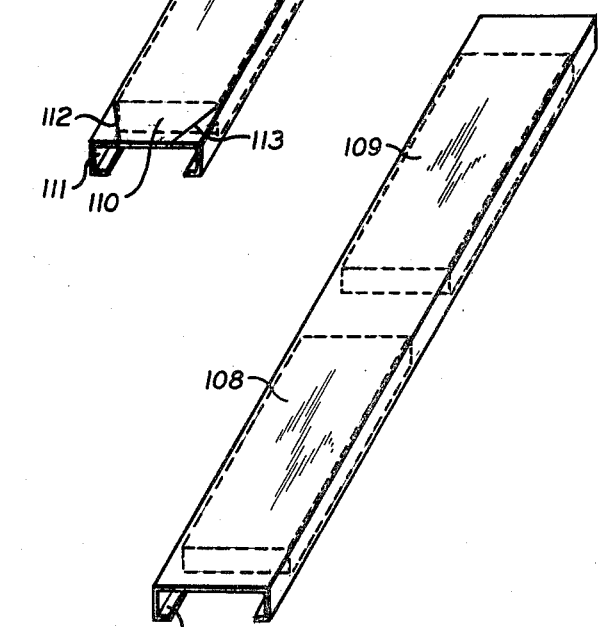
FIG. 5E.
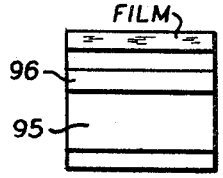
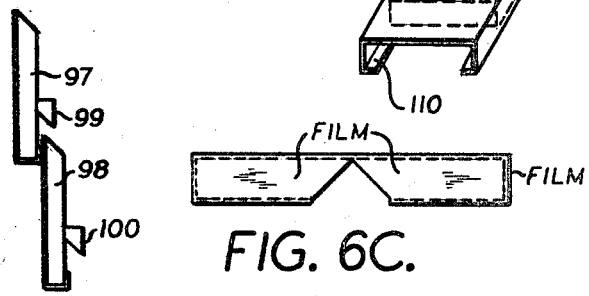
FIG. 6C.
INVENTORS
HAROLD V. ETTORE
FREDERICK R. ASHBY
HARLAN N. FACCOU
BY *James M. Heikman*
ATTORNEY.

United States Patent Office
3,475,261
Patented Oct. 28, 1969

3,475,261
PLASTIC COVERED LAMINATE, AND METHOD, AND APPARATUS FOR MANUFACTURING THE SAME
Harold V. Ettore, Yorktown Heights, and Frederick R. Ashby, Carmel, N.Y., and Harlan N. Faccou, Redlands, Calif., assignors to U.S. Plywood-Champion Papers Inc., a corporation of New York
Filed June 2, 1964, Ser. No. 372,020
Int. Cl. B32b 1/04, 3/00, 3/02
U.S. Cl. 161—43                    12 Claims

ABSTRACT OF THE DISCLOSURE

This invention pertains to a plain or textured plastic faced building material, the method of manufacture, and the apparatus therefor, and involves the covering of a large face area and sides of a substrate with a film and subsequently cutting the large face area into two smaller pieces.

---

Reference is made to copending application Ser. No. 228,478, filed Oct. 4, 1962, now Patent No. 3,383,262 inventors Ettore and Ashby, and to copending application Ser. No. 261,389, filed Feb. 27, 1963, Patent No. 3,228,164, granted Jan. 11, 1966, inventor Ettore, both above applications assigned to the same assignee as is the present application, i.e., U.S. Plywood-Champion Papers Inc.

The present invention is concerned with an improved laminated wood product and with the process and apparatus for the manufacture of the same. The invention is particularly concerned with a novel decorative line of plywood paneling which is laminated with a film as, for example, with a transparent or non-transparent film to produce high quality plywood panels adapted for use as interior and exterior wall panels, doors, furniture such as coffee tables, end tables, conference tables, library tables, and the like. The laminated panels of the present invention may also be employed for exterior uses as, for example, building side shingles, clapboards, roof shingles, and the like. The present invention is also particularly directed toward an improved method and unique apparatus for effectively and efficiently laminating the film to the wood surface. Thus, one aspect of the present invention is the utilization of techniques in combination, to create a new and original method of laminating film on plywood or other wood fiber panels.

It is known in the art to use wood panels, particularly plywood panels for interior and exterior wall paneling, doors and furniture. However, in many instances, due to the nature and character of the use, these panels are subjected to adverse weather, wear, stain, discoloration due to burning, and other trying high temperature conditions. It has now been discovered that if a film such as a polyvinylfluoride film be laminated to the face surface and also particularly to the sides of the wood panel, such as a plywood panel, the laminated product is remarkably and greatly improved with respect to its resistance to wear, to stain, to adverse high temperature conditions and against other conditions to which it is exposed when used, as for example resistance to dampness, moisture and water.

In addition, the problems presented by plywood panels in particular as a base material are inherent in the structure of the wood fibers. Stresses left in the veneer or veneers from cutting, drying, gluing, and ultimately pressing to become a plywood panel vary widely due among other factors to grain density, quality, maturity, thickness and the very structural nature of the logs from which the materials were accumulated or secured. Climatic variations of temperature and humidity affect the dimensional properties of the plywood panels. In many instances the effect of latent stresses is to cause the panels to curl, warp, buckle, bow, twist, as well as to swell and thusly change slightly in length and width. Plywood industry dimensional standards, therefore, include a sufficient range so as to encompass the variations described. These dimensional standards may at times vary between standard systems, from manufacturer to manufacturer, and from time to time within the same manufacturing plant.

One immediate primary end product among others of the present invention is a high quality laminated clapboard type lap siding which competes with relatively stable materials such as aluminum, hardboard and the like. The laminated plywood end product of the present invention holds tolerances considerably above industry standards and insures maximum utilization of the film beauty and is of a durability which is demanded of weather-proof joints and laps. The fasteners which depend on minimum variation of panel size, close tolerance undercut trimming, joint relief and splitting, may be used much more effectively for low labor cost installation and builder satisfaction. The end product has a uniform, wrinkle-free film application thus giving a pleasing appearance and consumer satisfaction.

The film laminating line of the present invention incorporates a combination of techniques which will effectively cope with warped, bowed, or twisted panels, variations in face grain density and consequent absorption of adhesives, sawdust, splinters, and industrial dust, and other problems which are peculiar to the plywood industry.

As pointed out heretofore, the invention is specifically concerned with an improved technique and combination of equipment for laminating the film to the board surface and especially to a technique of roll laminating and sealing in order to secure edge encapsulation of the panel edges with the film. By this latter technique, not only is the surface of the panel protected as hereinbefore described, but the edges are also protected in order to provide a splinter-free edge. Generally, the particular technique comprises applying the adhesive to the edges of the film itself in an initial or simultaneous operation, coating the surface or face of the board or panel with the adhesive and then applying the film which has been edge coated with adhesive to the surface of the panel followed by encapsulation, i.e., covering or sealing, of the edges or sides of the panel with the overlapping adhesive coated film.

The present invention may be more fully understood by reference to the figures illustrating embodiments of the same. FIGURE 1 is a diagrammatical flow sketch illustrating the sequence of the respective operations or stages. FIGURES 2 and 2A illustrate the method or technique of applying adhesive to the underside of the over-extending film which has been laminated to the face surface of the board. FIGURES 3, 3A and 3B illustrate in some detail the operation of stage 32 for the coating of the sides of the panel and the back side of the panel with adhesive. FIGURES 4 and 4A illustrate in some detail the method by which the over-extending film by unique type rollers is wrapped around the side and the underside of the panel as it moves along the production line. FIGURE 4A is enlarged view of the hat-shaped laminating roll, while FIGURE 4B is a modified construction illustrating the texturing, or preferably spaced grooving, rollers operating on the substrate or panel which has been preferably film-covered. FIGURES 5, 5A, 5B, 5C, 5D and 5E illustrate the technique of splitting the panel and one of its uses. FIGURES 6, 6A, 6B and 6C illustrate the process of encapsulating four sides and the product secured by splitting.

Referring specifically to FIGURE 1, a production or material flow line 20 is illustrated. In accordance with the process, individual panels are fed preferably from an automatic panel feeder 21 onto process conveyor or material line 20. By way of illustration, the panels may have a width of 25 3/16" (lap siding) or are 48 1/4" wide and are mechanically or automatically placed on conveyor 20 from feeder unit 21. Generally, these panels are placed on conveyor 20 with about a 1" gap between the respective panels. Also the panels are usually about 1/2" longer than the final desired length.

These panels pass through pinch rolls 22 to edge trim shapers 23 which trim the panels to the desired tolerances. These trim shapers 23 trim each side of the panel down so as to secure a width of about 23 15/16", or a width of 48" for the flat panels. The purpose of this operation is to produce smooth, precision cut edges and to provide ease of transportation and to facilitate the edge encapsulating operations.

The conveyor 20 preferably is in sections of 20' lengths or more or less as required. These sections incorporate quite horizontal chain drive, minimum horsepower requirement and may be coupled to a single power source for all sections as required. The conveyor 20 works in conjunction with a precision side drive rollcase and a conveyor with variable speed; adjustable for panel width and capable of continuous uniform delivery of plywood panels to and through the various process stages at uniform speeds while maintaining the panels in a substantially perfect dimensional position for cutting, for sizing, for cleaning, for spraying and for laminating.

Basically, this is accomplished up to the laminating stage with a row of the six inch diameter side drive wheels with a two inch face in contact with the edges of the panels on both sides at about 12 to 16 inch center to center intervals, as the panel is borne along on top of the rollcase. The side drive rolls are mounted horizontally with most of the 2 inch face above the top of the level of the precision rollcase and supported by a vertical shaft, offset 1/2 degree in the direction of material flow. This provides a considerable desirable downward thrust on the edge of the panel as it is driven forward and is sufficient to straighten and hold flat a panel having the most common plywood stress condition, i.e. a panel with a twist and bow.

The drive roll shaft is bearing mounted at the end of a bell crank like drive roll bracket parallel to and approximately one inch above the top of the heavy main conveyor frame (4 x 6 steel box section) with a roller chain drive sprocket on the driven side mounted horizontally at the lower end of the drive shaft, below the bracket and above the conveyor frame. The bracket is mounted on a precision located vertical shaft that allows the drive roll bracket and drive roll to swing in toward the panel edges except that the swing is restricted by an adjustment arm projecting at 90 degrees under the rollcase and restrained on the idler side by two adjustable set screws and on the drive side by a small air cylinder which acts against the adjustment bracket at an adjustable pressure (10# normally) to squeeze the drive rolls against the panel edges and thus push the panel across the conveyor rollcase to the idler drive rolls on the opposite side. The amount of squeeze (1/64" normally) is limited by a set screw opposite the air cylinder push rod.

On the drive roll side of the conveyor the drive roll bracket is offset on approximately a two inch radius to provide limited movement under the rollcase rolls. The drive roll bracket is mounted as described on a 4 x 6 steel box beam 20 feet long to match the main conveyor frame, carried on four precision glide blocks running on steel ways supported on 4 x 6 beams bolted across the conveyor to the main frames to produce an adjustable beam supporting the drive rolls to accommodate panels from 10 to 50 inches in width. The rolls are adjusted simultaneously with four Acme thread lead screws, linked together with roller chains and sprockets and passing through Acme threaded bronze nuts fastened to the adjustable beam and supported by pillow block bearing under the main conveyor frame, crank operated from projecting hubs.

The edge trim joint heads or shapers 23 maintain a uniform panel width. Basically these are square 3600 r.p.m. saw motors mounted on machined glide blocks and ways for 4" horizontal adjustment. On the idler drive roll side the edge trim is limited to the vertical and horizontal adjustments described. The jointing head on the drive roll side, however, is mounted on the adjustable beam with the drive rolls to provide simultaneous panel size adjustment as the conveyor is adjusted for varying panel widths.

After the panels pass through the edge trimming shapers 23, they pass through cleaning stage or zone 24. In essence, the cleaning step consists of a vegetable fiber brush rotating in an opposite direction from the direction of movement of the panel. Vacuum means are mounted in this section to exhaust the dirt and dust from the panel face. One means is to use a conventional rotating 12" diameter brush and continuous vacuum pick-up.

The variations in the plywood panel face grain density affects the rate of adhesive absorption. Thus, a prime or seal coat of adhesive is necessary to maintain uniform adhesive thickness. This is accomplished in stage 25 with a standard direct or reverse roll coater before the radiant heat stage 26.

The resin adhesive is a modified epoxy containing epoxy, acrylic, an accelerator and a catalyst. (Epoxy Resins—Their Applications and Technology, by Henry Lee and Kris Neville—McGraw-Hill Book Co., 1957, N.Y.)

After the prime or seal coat is applied in stage or zone 25, the panel or panels pass to a radiant heat zone 26 wherein the seal coat solvents are evaporated. Sufficient heat is applied to the surface in zone 26 so as to accelerate the adhesive drying which is applied by rollcoater in zone 27. While any type of heat may be utilized in zone 26, it is preferred that the heat be applied by the use of infra-red heat generators. These heat generators consist of about a 50" x 10' blank of infra-red heating elements. The panel face temperatures are varied by raising or lowering the heat bank. This heat zone 26 is operated at a temperature in the range between 125° and 250° F., preferably about 150° and 200° F., as for example at about 175° F. The panels then pass to zone 27 which, in essence, consists of a direct drive or reverse rollcoater. In this zone a modified epoxy adhesive top coat is applied to the panel face with a direct or reverse roll coater although an air spray or airless spray equipment could be used. The adhesive solvents are flashed off utilizing a circulating hot air oven or an infra-red oven or these solvents may be flashed off at ambient temperatures.

The panels coated as described above are removed from zone 27 and passed to impingement oven zone 28. Here temperature conditions are adjusted to dry and heat the adhesive to the proper tack before laminating with the film. The temperatures employed are in the range from about 150° F. to 275° F., preferably in the range from about 175° F. to 250° F., as for example about 210° F. Adhesive may be applied to film and dried instead of to panels.

The time that the panel is in the oven is dependent upon line speed but is always 1/3 to 1/2 minute upon a normal production line speed. Since the oven length is 25' and maximum line speed is 50 ft./min., panels will not be exposed to more than 1/2 minute in the oven at top line speed.

The panels covered with the epoxy resin of the correct tackiness then pass from zone 28 to the film laminating zone. The film is withdrawn from roll 29 using any standard technique and equipment. The film is applied to the panels by rotary laminator 30. These laminating rolls are preferably maintained at a temperature in the range from about 100° F. to 125° F., dependent upon the line speed. The width of the film removed from roll 29 is greater than the width of the panel being coated by an amount equivalent to twice the thickness of the panel and the degree to which the film is wrapped or laminated on both undersides of the panel.

The panel and the overextending film is then moved through or by film adhesive applicators 31 and thence past panel edge and back glue tool 32.

Thus the panel laminated with the film moves along to zone or stage 31 wherein the overextending underside of the film is glued. As pointed out heretofore, the film overextends the panel on either sid to the extent of the thickness of the panel and the extent it is desired to wrap the film on the underside of the panel. The details of applying adhesive to the underside of the overextending film in stage 31 are illustrated in FIGURE 2.

Referring specifically to FIGURE 2 which illustrates details of stage 31, one type of film applicator is illustrated as 60 which contains hole 61 through which adhesive flows upwardly against the underside of the overextending film. Adhesive is supplied into applicator 60 by means of adhesive line 62. FIGURE 2A shows the front view of a panel 63 moving along the production line with the film 64 overextending as shown. This film moves along applicator 60 in order to undercoat the same. A brush 65 or other equivalent means holds the film in firm contact with the glue applicator.

Thus, in zone 31 an adhesive is applied to the underside of the overhanging film. The glue applicator tools are located on the down side of the heated laminating rolls 30. Adhesive is pumped through the orifice in the tools by air pressure and is preferably controlled by a microswitch assembly in the circuit.

After the underside of the overextending film has been coated, the unit moves to zone 32 wherein the sides of the panel and the back of the panel are also coated with adhesive. Details of zone 32 are illustrated in FIGURES 3, 3A and 3B. Referring specifically to FIGURE 3, a panel side and underside applicator 70 is shown containing ports 71 for the coating of the side of the panel and ports 72 for the coating of the underside of the panel. Adhesive is pumped into applicator 70 by suitable means 73. FIGURE 3A illustrates a front view of panel 74 moving along applicator 70 and shows the overextending edge of film 75. Under certain conditions units 70 may contain glue applicator holes in the top thereof, and thereby eliminate the necessity for unit 60. The sequence of the respective operations is illustrated in FIG. 3B and shows the position of the glue applicator rolls in relation to the heated laminating roll 30.

The panel moves to zone 33 wherein the same is air dried prior to the wrap around operation in zone 34. The microswitch 79 is approximately 12" from the drive roll 11 (FIGURE 3B). The tool for applying adhesive 60 to the film underside is approximately 6" from the switch at edge tool 70 which is approximately 9" from the switch.

The solvent which had been applied in the rubber based adhesive in zones 31 and 32 is flashed or removed in zone 33. The distance between the adhesive applicator and zone 34, FIGURE 1, is about 8 feet. Therefore, dependent upon the speed, the air dry zone time could be about 10 sec. at high speeds and about 24 sec. at low speeds.

FIGURES 4 and 4A illustrate the technique and equipment employed in zone 34 to wrap the overextending film around the sides and the underside of the moving panel. FIGURE 4 also illustrates the hold-down head 80 and conveyor system 80A hereinbefore described. The conveyor 80A is a level, knurled steel, precision 5' wide approximately, horizontal drive roll conveyor with rolls 81 and 8" on center driven in the main frame beams strand roller chain concealed in the main frame beams with the panel being held rigidly and flat by four 6" diameter pneumatic hold-down wheels 82 directly over many of the horizontal drive rolls.

In order to produce beauty and a textured surface, rollers 82 may be provided with a series of preferably circumferential grooves whereby at spaced distances across the panel, siding or shingle an embossed longitudinal grooved area may be produced. Obviously, the embossing rollers could be separate from and independent of the hold-down rollers, or (because of the necessary high pressure required) could be placed on a separate strong head bar 180 designed to impart very high pressure by any conventional means, such as screw 181 and adjusting nut 182, to one long embossing roller over the entire panel width, with or without spaced plain or unembossed surfaces, or to a series of either contiguous or spaced embossing rollers 82A.

The number of grooves, their depths, and the spacing between individual grooves and sets of grooves or rollers may be varied widely to suit individual preferences and yet obtain the beneficial results as set forth herein. All the grooves may be of equal depth (and the same or of different depths throughout their entire length) or of random depth relative to each other.

The embossing rollers may be operated cold but are preferably heated in any one of a number of ways (not shown). Not only does the heat cause the film to stretch and flow better but it softens the underlying wood so that the lignocellulose fiber will be crushed and deformed so as to eliminate spring-back and to eliminate or reduce the expansion and contraction of the panel over its entire width by providing intermediate embossed areas in which localized movement in the panel may occur.

To allow adhesive application and strip heaters or ambient air to accelerate drying, the first 10 foot length of the conveyor has four rows of short 6" rolls in special adjustable roll cases carried on machined glide blocks that will slide to allow panels of varying width to pass over the top of two or more parallel rows of the 6" wide roll cases, leaving the edges and underside of the panel edge open for the application of adhesives and drying.

The edge encapsulating rolls are located just beyond the coating and drying section and function as described.

The panel as laminated and encapsulated is wide enough to allow a splitter saw following the encapsulating rolls to cut the panel to make two lengths of lap siding which also makes the $\frac{1}{32}$" wide ($\frac{1}{64}$ to 1) top joint that serves to wedge and fit the panels horizontally on field installation.

A guillotine, which is a very fast automatic device, is used to cut the continuous film during the time interval when the 1" gap between the panels leave the laminator or zone 34.

Also, the line includes a cross transfer system that leads the panels through an edge trim saw that cuts the panels to length squarely across the width of the panel with a 2 degree relief angle to allow a tight fit at the top face, but increasing the space below to allow some expansion along the length of the panel and/or space for a joint caulking compound.

The edge encapsulating rolls 83 and 84 are machined preferably from one piece of aluminum and are silicone coated to provide a negative affinity for the film adhesive. Basically the roll consists of a top cylindrical section 4" or other in diameter, $\frac{3}{4}$" high and parallel to a 6" diameter machined plane which flares out 1½" on an arc-angle to a 9" diameter base (see FIGURE 4A).

Hat-like in appearance the top roll functions to hold erratic panels flat and in close proximity to the flat 6" diameter plane which wipes the film, in a slight arc away from the previously laminated surface from which the film projects. The motion of the material being forced through the roll negatives the wiping arc to a virtually straight pull. The flared brim serves to lead the drooping film smoothly to the wiping plane. The ½ degree roll lead angle relieves the wiping action and resulting tension on the film automatically as the roll passes center.

The rolls are held with adjustable pre-set springs in compression (or suitable air or hydraulic cylinders) to maintain a constant 1/64" squeeze at controlled pressure. Thus the roll is perpendicular to the top plane of the passing panel (holddown action), and vertically at 90 degrees to the panel edge with a 1 degree offset for relief promptly after wrapping (wiping action).

The encapsulating rolls are used in series, in this case wrapping one edge using the roll described and approximately one inch of the back-side which requires another roll of the same type mounted with hold-down and wrapping planes horizontal rather than vertically as described above. Thus rolls 83 function to laminate the film to the sides of the panel while rolls 84 function to laminate the film to the desired degree to the undersection of the panel. FIGURE 4A shows details of the film encapsulating rolls.

After the panel has been encapsulated as described, it is moved forward to the splitting zone 36 (FIGURE 1). Here each panel if originally 25 3/16" wide is split into two sections with each section 11 7/8" wide and x' in length. The method by which the panel is split is illustrated in FIGURES 5, 5A, 5B, 5C, 5D and 5E wherein panel 90 is shown encapsulated with film 91 and wherein the panel is split at a 45° angle 92 as shown. The 48" wide flat panels would not be split in this operation.

Thus panel 90 is encapsulated with film on its face or top, and along both sides and to a certain degree on its under surface as shown in FIGURE 5A. The ends are not encapsulated. FIGURE 5A and 5B illustrate the technique of cutting so as to produce 2 similar units 93 and 94. FIGURE 5C shows a single unit 95 which is then handled in a suitable manner to attach thereto on the rear an alignment strip 96 as shown in FIGURE 5D. FIGURE 5E illustrates the use of a plurality of shingles 97 and 98 with respect to one another for siding and the like. It is to be noted that alignment strips 99 and 100 are undercut on the lower edges. Thus the upper edge of shingle 98 will seat securely between strip 99 and the back surface of unit 97. The sides of units 97 and 98 are not encapsulated with film.

Under certain conditions it is very desirable to encapsulate the three sides of the panel with film. When this is done the film is not cut to the length of the panel, but an overage is provided sufficient to cover the ends and the amount to be coated on the underside adjacent the ends. Referring to FIGURE 6, two panels 105 and 106 are diagrammatically shown moving along the production line. The face surfaces and the sides and a portion of the under sides have been encapsulated with film as hereinbefore described. There exists a gap between the front edge of panel 105 and the rear edge of panel 106. The length of the gap, covered with film, is such that there is sufficient film to cover the front end of panel 105 and the rear end of panel 106 and to undercover each panel to the desired degree.

Then prior to splitting, stage 36 (FIGURE 1), and as described in FIGURES 5 and 5A the film is cut in the gap at line 107 as shown. FIGURE 6A illustrates a plurality of panels 108 and 109 moving along a production line covered with film 110 prior to cutting the film between panels 108 and 109. FIGURE 6B illustrates a single panel 110 with its face and sides encapsulated with film 111. As can be seen the film overextends both the front and back edges of the panel.

At this point the four corners of the overextending film are diagonally clipped or cut off as illustrated by lines 112, 113, 114 and 115. The panel is then turned 90 degrees and the overextending clipped film is laminated to the front and rear edges by the technique used to laminate the film to the sides of the panel. If shingles or siding is desired the panels are split as hereinbefore described. The panel secured is shown in FIGURE 6C.

Thus in operation the operator will feed one panel into the edge encapsulation adhesive and forming equipment as described. The encapsulated long edge is the leading edge. The 96" long panel or shorter panel is automatically driven through a 90° adhesive applicator tool on each end of the panel. The right angle tool will form the excess film to the panel edge and will then apply adhesive over the formed excess film and the panel edge and back. Adhesive is then applied to the underside of overhanging film. The heated dish shaped forming rolls follow and bond the film to the panel edge and back.

The transparent or pigmented film may be of any type as, for example, a polyvinylfluoride type of film. The thickness of the film may be varied appreciably as, for example, in the range of about .001 to .02. A preferred thickness is in the range of about .003 inch. A particular type of satisfactory film is one manufactured by The Goodyear Tire & Rubber Company, designated as Videne (polyester film) as described in the April 1962 issue of National Forest Products Week magazine. Other satisfactory films are Tedlar (polyvinyl fluoride film) as sold by E. I. du Pont deNemours and Co., Inc. The adhesive may be any satisfactory type of adhesive designed to secure lamination of the film on the panel. The panel itself or substrata is a plywood panel containing from about 3 to 7 laminations and having a thickness in the range from about 1/4" to 3/4" and higher.

By sealing the edges of the panel along the face of the panel with a transparent or pigmented plastic, the edges are sealed from moisture and a splinter-free edge is provided for handling by a carpenter or user.

Thus the present invention is concerned with a unique technique and with the use of a combination of material and equipment which will produce a high quality laminated plywood product suitable for a great many uses and applications.

The special roll laminating process results in a laminated plywood product which is tough and durable and which is substantially a maintenance free material. When used as an exterior covering it will keep a home or equivalent unit beautiful for years.

No painting is required and the only maintenance needed is an occasional hosing off of the weather boards in order to remove loose dirt.

These plywood products may be embossed with any design or pigmented to produce any desired and pleasing color or hue. These laminated products are outstandingly weather resistant and will be inert toward chemicals, solvents and staining agents. The film is strong, flexible and fatigue resistant. It retains its toughness and flexibility over a wide temperature range. The film surface does not chalk, craze, discolor or erode.

The utilization of plywood in combination with the film produces outstanding results. Plywood combines the ease of working that is inherent to wood with the desired additional advantages of resistance to splitting and impact, dimensional stability, warp resistance and desired rigidity, excellent nail bearing and far superior strength due to the cross laminate construction. Pound per pound, plywood is stronger than steel or aluminum.

Thus the laminated plywood product does not warp or shrink, provides warmth and insulation and requires fewer joints to provide all year weather tight construction. The product has strength and rigidity, is scratch resistant, does not conduct electricity, is light of weight and easy to handle, thereby materially reducing labor and construction costs.

What is claimed is:

1. An article comprising a wood substrate covered on its face, sides and a portion only of its back with a polyvinyl fluoride plastic decorative film, said film and underlying substrate being textured by a series of grooves, each group of grooves being spaced apart, said substrate having a triangular groove with its base on the back of the substrate whereby the substrate can be readily formed to make two identical but separate pieces.

2. Process for the manufacture of a high quality laminated product which comprises coating the face of a fibrous panel with a thermosetting adhesive, thereafter applying a thin plastic polyvinyl fluoride film to said face, said film being characterized by having a portion overextending the face of said panel on both sides, applying adhesive to the sides of said panel and to a portion of the underside along said sides, thereafter rolling and laminating said portion of said film which overextends said sides and said underside of said panel, and further splitting the laminated panel by imposing a V-shaped cut on its underside, said cut being parallel to the sides and equally distant therefrom, whereby two identical units are secured.

3. Process for the manufacture of a high quality laminated product which comprises coating the face of a wood fibrous panel with a thermosetting adhesive, thereafter applying a thin plastic polyvinyl fluoride film to said face, said film being characterized by having a portion overextending the face of said panel on both sides, applying adhesive to the sides of said panel and to a portion of the underside along said sides, thereafter rolling and laminating said portion of said film which overextends said sides and said underside of said panel, wherein said film is roll laminated in an initial phase to the sides of said panel and in a second phase is roll laminated to a portion of the underside of said panel, and further texturing said plastic covered face by a series of texturing rollers.

4. Process for the manufacture of a laminated high quality fibrous panel which comprises in combination the steps of edge trimming of the panel, thereafter cleaning and applying a seal coat adhesive to the face of said panel, passing the panel through a radiant heat zone to eliminate volatiles, applying adhesive to the face of said panel over said seal coat, passing the adhesive coated panel through a drying oven, applying an enlarged plastic film to the face of said adhesive coated panel, said film overextending both sides of said panel for at least a distance equal to the thickness of said panel, thereafter applying adhesive not only to the sides of said panel and to portions of the underside of said panel which are parallel with and contiguous to said sides, but also to the undersides of said overextending plastic film, then in an initial stage laminating a portion of said overextending plastic film to the sides of said panel, in a second stage laminating the remainder of said overextending plastic film to said adhesive coated underside portions of said panel, and thereafter passing the laminated product to a splitting zone wherein at least one cut is made on the under plastic film-free back to produce two identical panels having a plastic film-free side.

5. Process as defined by claim 4 wherein said cut is formed in a triangular manner with the base of the triangle starting from the film-free back, and using hat-shaped rolls in at least one of the stages to laminate the overextending film to the panel.

6. In an apparatus wherein conveyor means are utilized to pass a panel along, wherein film applying means are utilized to position an enlarged plastic film to the top of said panel so that said film overextends the sides of said panel to a distance greater than the thickness of said panel, wherein means are provided for applying adhesive to the sides of said panel and to portions of the underside of said panel parallel to and contiguous to said sides, the improvement which comprises in combination an initial rotating roll adapted to laminate the film to the side of said panel, and a follower rotating roll adapted to laminate said film to the underside portion of said panel contiguous to said sides.

7. Apparatus as defined by claim 6 wherein said initial and said follower rolls are characterized by being hat-shaped with top cylindrical sections, the top planes of which are above and parallel to greater diameter intermediate planes which flare out to even greater diameter parallel base planes.

8. An apparatus as defined by claim 7 wherein the overextending film rides over an upwardly extending adhesive applicator having apertures in the head portion thereof from which adhesive is forced against the adjacent portion of the film.

9. Apparatus as defined by claim 7 wherein the axis of rotation of said initial roll is parallel to the plane of said panel and wherein the axis of rotation of said follower roll is perpendicular to the plane of said panel.

10. Apparatus as defined by claim 9 wherein spaced apart rollers impart to the plastic film and underlying panel a textured area.

11. Apparatus as defined by claim 7 wherein the diameters of the top cylinder sections are 4", wherein the upper portion of these cylindrical sections are approximately ¾" above said intermediate planes, wherein said intermediate planes are 6" in diameter and wherein said base planes are 9" in diameter and approximately 1½" distant from said intermediate planes.

12. An apparatus as defined by claim 11 wherein the panel rides over an L-shaped applicator having apertures in the adjacent bottom and side facing the bottom and side of the panel whereby adhesive is applied to the contiguous portions of the panel.

References Cited

UNITED STATES PATENTS

| | | | |
|---|---|---|---|
| 2,304,123 | 12/1942 | Rowe. | |
| 3,112,580 | 12/1963 | Gould | 161—123 XR |
| 3,228,823 | 1/1966 | Usala | 161—189 XR |
| 3,300,927 | 1/1967 | Bettoli | 52—309 |
| 3,375,152 | 3/1968 | Lundberg et al. | 156—212 |
| 1,498,532 | 6/1924 | Ambler. | |
| 2,154,143 | 4/1939 | Whelan | 156—216 X |
| 2,576,121 | 11/1951 | Kamborian | 156—216 X |
| 3,058,868 | 10/1962 | Schroeder | 156—216 X |
| 3,076,738 | 2/1963 | Uschmann | 156—331 |
| 3,228,164 | 1/1966 | Ettore | 52—539 |

ROBERT F. BURNETT, Primary Examiner

W. A. POWELL, Assistant Examiner

U.S. Cl. X.R.

52—309, 539; 156—212, 216, 220, 268, 278, 479, 510; 161—44, 106, 121, 123